Sept. 26, 1967 A. L. M. FETTWEIS 3,344,368
BANDPASS FILTER
Filed Oct. 22, 1962 7 Sheets-Sheet 1

Inventor
A.L.M. FETTWEIS
By Phillip A. Weiss
Attorney

Sept. 26, 1967    A. L. M. FETTWEIS    3,344,368
BANDPASS FILTER

Filed Oct. 22, 1962    7 Sheets-Sheet 2

*Inventor*
A.L.M. FETTWEIS

By Phillip G. Weiss
*Attorney*

Inventor
A.L.M. FETTWEIS
By
Attorney

Sept. 26, 1967 A. L. M. FETTWEIS 3,344,368
BANDPASS FILTER

Filed Oct. 22, 1962 7 Sheets-Sheet 4

Inventor
A.L.M. FETTWEIS
By Phillip G. Weiss
Attorney

Inventor
A.L.M. FETTWEIS
By Philip G. Weiss
Attorney

Sept. 26, 1967   A. L. M. FETTWEIS   3,344,368
BANDPASS FILTER

Filed Oct. 22, 1962   7 Sheets-Sheet 6

Inventor
A.L.M. FETTWEIS
By Philip G. Weiss
Attorney

Sept. 26, 1967 A. L. M. FETTWEIS 3,344,368
BANDPASS FILTER
Filed Oct. 22, 1962 7 Sheets-Sheet 7

Inventor
A.L.M.FETTWEIS
By Phillip A. Weiss
Attorney

United States Patent Office 3,344,368
Patented Sept. 26, 1967

3,344,368
BANDPASS FILTER
Alfred Leo Maria Fettweis, Antwerp, Belgium, assignor to International Standard Electric Corporation, New York, N.Y., a corporation of Delaware
Filed Oct. 22, 1962, Ser. No. 232,180
Claims priority, application Netherlands, Oct. 27, 1961, 270,714
1 Claim. (Cl. 333—72)

ABSTRACT OF THE DISCLOSURE

Crystal bandpass filters having one or more cascaded sections which through design methods utilize hybrid transformer portions and parasitic elements as filter components.

---

The invention relates to a bandpass filter using electromechanical resonators such as piezoelectric crystals operating between resistive terminations and comprising one or more lattice section(s) in cascade, or equivalent bridge type section(s) replacing said lattice section(s), such as hybrid transformer section(s).

Such bandpass filters are well known and reference may be made for instance to the article by A. R. D'heedene, published on pp. 83 to 93 of the 1957 IRE Wescon Convention Record, Part 6.

A general object of the invention is to realize a wide variety of new and improved crystal filters.

Another object of the invention is to realize filters which may readily be calculated by means of the insertion loss theory in order to reach the most economical structure, i.e., that employing the smallest number of coils and crystals compatible with given attenuation requirements.

Yet another object of the invention is to realize bandpass crystal filters such that the high impedance sections containing the crystals can readily be incorporated in the rest of the filter structure while, particularly for a range of crystal filters such as a series of channel filters used in carrier telephony, the impedance levels of the lattice or equivalent sections containing the crystals can easily be changed so that the crystal equivalent inductances can to a certain extent be chosen arbitrarily.

A further object of the invention is to realize bandpass crystal filter structures wherein a lattice section or an equivalent $\pi$- or T-section can be transformed into an equivalent hybrid transformer section without necessitating an additional transformer.

Yet a further object of the invention is to realize bandpass crystal filter structures wherein the parasitic elements such as the parasitic capacitances and the leakage inductances of the transformers can readily be taken into account in the filter design.

In accordance with a characteristic of the invention, a bandpass filter as initially defined is characterized in that said inductive elements comprise a shunt element on one side of said lattice or equivalent section(s) and a series element on the other side.

In accordance with another characteristic of the invention, said filter includes two sections each surrounded by a series and by a shunt inductive element in cascade with one another and said series inductive elements separating one section from another.

In accordance with yet another characteristic of the invention, said shunt inductive element is constituted by a transformer.

In accordance with a further characteristic of the invention, said lattice or equivalent sections are exclusively composed of crystals and capacitors.

Such structures have various advantages and in particular they permit the actual realizations using hybrid transformers to be carried out without the addition of transformers to the original structure used for the design. This would not be the case if two such sections each surrounded by two series coils were cascaded. Alternatively, when using one or more sections surrounded by shunt coils, this corresponds to structures exhibiting at least one attenuation pole at zero frequency, whereas in channel filters what is generally required is an attenuation pole at infinite frequency. This will be afforded by a structure in which two cascaded sections surrounded by inductive elements include a series coil between the two sections. It has also been found that with a series coil separating the two cascaded crystal sections, it will be possible to readily take into account the leakage inductance effects and more particularly the leakage inductance effects of the transformers surrounding the two cascaded sections and which transformer will in particular permit the use of the high impedance crystals while lower impedances are used outside these two transformers. Also, if such a filter structure involving two such cascaded crystal sections is calculated on an insertion loss basis in order to achieve the desired attenuation requirements in the most economical manner, it will be found that the above realization with a series coil separating the two crystal sections surrounded by two transformers will be easier to calculate. When the crystal sections include only crystals and capacitances, they are capacitive both at low and at high frequency and accordingly when it is surrounded by a shunt coil on one side and by a series coil on the other side, such a section, coils included, will provide at least an insertion loss pole of order 1 both at zero and at infinite frequency.

In accordance with another aspect of the invention, the filter design can be proceeded with by using ladder structures including $\pi$- and T-sections and in such a design it has been found that when combining several such sections in cascade, particularly when the design is made on an insertion loss basis, advantages can be secured by designing such $\pi$- or T-sections including a crystal equivalent structure in one branch and capacitors in the other two branches in such a way that said capacitors are of unequal value.

Hence, in accordance with a further characteristic of the invention, a bandpass filter as initially defined is characterized by the fact that it includes at least two sections containing crystals and capacitors only, and each surrounded by inductive elements on each side of said sections, said sections being constituted by a bridge type section involving three capacitors in each of the first three branches and one or more crystals associated with one or more capacitors in the remaining fourth branch plus a transformer or alternatively by a lattice or hybrid transformer section with a shunt capacitor on one or the other side of said lattice or hybrid transformer section, or with series capacitors of one or the other side of said lattice section, or with series capacitors on the side of said hybrid transformer section opposite the hybrid transformer part of that section.

The above and other objects and characteristics of the invention and the best manner of attaining them will be better understood from the following detailed description of various embodiments of the invention to be read in conjunction with the accompanying drawings which represent:

FIG. 4, the equivalent circuit of a series coil including parasitic capacitances;

Figure 1:
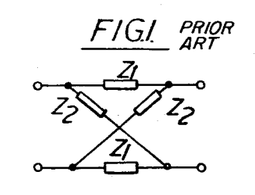
FIG. 1, a conventional lattice section.

Referring to FIG. 1, the latter shows a classical lattice section comprising the pair of equal series impedances $Z_1$ as well as the pair of equal diagonal impedances $Z_2$.

Such lattice sections have been widely used for realizing conventional crystal filters and reference may be made for instance to the above-mentioned article by A. R. D'heedene which is a review of crystal filter developments.

Figure 2:
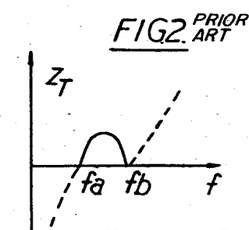
FIG. 2, a $Z_T$ type image impedance characteristic for the lattice section of FIG. 1.
Figure 3:
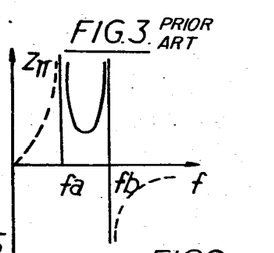
FIG. 3, a $Z_\pi$ type image impedance characteristic for the lattice section of FIG. 1.

FIGS. 2 and 3 show the type of image impedances which the lattice section of FIG. 1 may exhibit. FIG. 2 shows the $Z_T$ type of image impedance plotted in function of the frequency $f$, while FIG. 3 shows a like plot for the $Z_\pi$ type of image impedance. Both are resistive within the passband as indicated by the full line of the characteristic from the lower cut-off frequency $f_a$ to the upper cut-off frequency $f_b$ and reactive outside the passband as indicated by the dotted line parts of the characteristic. As shown in FIG. 2, the $Z_T$ impedance drops to zero at both edges of the passband whereas at these points the $Z_\pi$ image impedance of FIG. 3 goes towards infinity. As shown by these two figures, this means that below the passband the $Z_T$ image impedance is capacitive while it is inductive above the passband, whereas the opposite state of affairs occurs for the $Z_\pi$ image impedance.

Since the image impedance of a lattice filter as shown in FIG. 1 is equal to the geometric mean of the two lattice impedance values $Z_1$ and $Z_2$, this means that for a $Z_T$ type of filter with an image impedance as shown in FIG. 2 both $Z_1$ and $Z_2$ must be inductive at high frequency and capacitive at low frequency. Similarly, for the $Z_\pi$ type of filter with the image impedance as shown in FIG. 3, one should have a reverse state of affairs for these two impedances $Z_1$ and $Z_2$.

Figures 4, 7:
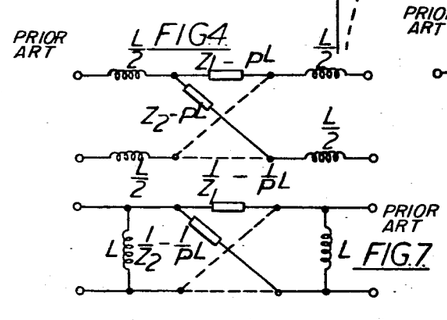
FIG. 4, the lattice section of FIG. 1 in which series inductances common to all branches have been extracted.
FIG. 7, the lattice section of FIG. 1 in which shunt inductances common to all branches have been extracted.

As explained in the above reference, if in order to secure relatively wide band lattice filters, the impedances $Z_1$ and $Z_2$ are made to include series inductances and if both $Z_1$ and $Z_2$ include a series inductance of the same value, in accordance with Mason's theorem this common inductance can be extracted as shown in FIG. 4.

FIG. 4 represents a lattice network rigorously equivalent to that of FIG. 1, but the actual lattice section of FIG. 4 is now made up of the pairs of series impedances $Z_1-pL$ and diagonal impedances $Z_2-pL$, where $p=jw$ with $w$ representing the angular frequency, whereas both the balanced input and output circuits of the quadripole include a series inductance L equally distributed in the upper and the lower conductors as the inductances $L/2$ shown in FIG. 4, thus keeping a balanced structure. The impedances $Z_1-pL$ and $Z_2-pL$ are now capacitive at high frequency as well as at low frequency. As is customary in symmetrical lattice representation, in FIG. 4 and further figures showing lattice sections, only one out of each pair of series and diagonal impedances is shown, dotted line connections being used for the other.

Figure 5:
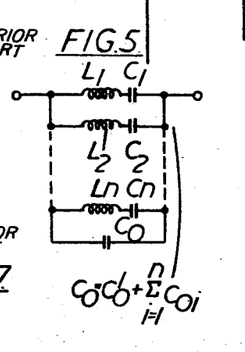
FIG. 5, a reactive dipole structure which is capacitive both at low and at high frequency.

FIG. 5 shows a possible structure for the impedances $Z_1-pL$ or $Z_2-pL$. The dipole reactance structure shown is Foster's second canonic form using a plurality of series resonant circuits $L_1, C_1, L_2, C_2 \ldots, L_nC_n$ all in parallel and in addition a parallel condenser $C_o$. This structure which is capacitive both at high and at low frequency can readily be constructed by branching in parallel $n$ circuits of the type shown in FIG. 6.

Figure 6:
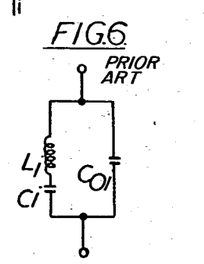
FIG. 6, a two capacitance-one inductance reactive dipole equivalent of a crystal.

FIG. 6 shows a series resonant circuit $L_iC_i$ in parallel with a shunt capacitor $C_{oi}$. A number $n$ of such dipoles plus possibly an additional shunt condenser $C_o'$ (not shown) will be able to make up the dipole of FIG. 5 so that $C_o$ will be equal to the sum of $C_o'$ plus all the $n$ shunt condensers $C_{oi}$, as indicated in FIG. 5. Provided $C_o$ occurring in the dipole of FIG. 5 is sufficiently large, it will be possible to select the dipoles of FIG. 6 in such a manner that a sufficiently large ratio $C_{oi}/C_i$ can be chosen for each of the $n$ dipoles so that each of these can be realized by means of a crystal. This requires the relative bandwidth of the bandpass filter to be sufficiently small.

By duality, an analogous reasoning for the extraction of common shunt inductances by Mason's theorem can also be made if the lattice of FIG. 1 provides an image impedance of the $Z_\pi$ type shown in FIG. 3. Then, both $Z_1$ and $Z_2$ must be capacitive at high frequency and inductive at low frequency so that if both $Z_1$ and $Z_2$ include a parallel inductance of like value, this can be extracted and the remaining admittances $$\frac{1}{Z_1}-\frac{1}{pL}$$

and $$\frac{1}{Z_2}-\frac{1}{pL}$$

will each be realizable by structures of the type shown in FIG. 5 so that the previous comments apply.

FIG. 7, shows a quadripole equivalent to that of FIG. 1 after like shunt inductances L have been extracted from $Z_1$ and $Z_2$. This time the extraction on an admittance basis produces two inductances L, one in shunt across the input and the other in shunt across the output.

Both for FIG. 4 and for FIG. 7, the lattice included between the coils will be capacitive both at high and at low frequency. Considering the filter section of FIG. 4, at high frequency its transmission goes to zero at least as fast as $1/w^3$ where $w$ is the angular frequency. As the reflections between the image impedances and the terminating resistances contribute a decrease of $1/w$, this will result in the filter of FIG. 4 having at least one full image attenuation pole at infinite frequency. In terms of insertion loss theory, the transfer function can be said to decrease at high frequency at least as fast as $1/w^3$ or in other words the effective attenuation exhibits at infinite frequency an attenuation pole of order not smaller than $3/2$. This remains true whether the filter of FIG. 4 is calculated by means of the image parameter or the insertion loss theory. Likewise, the filter of FIG. 7 contains at least one image attenuation pole at zero frequency, or in terms of insertion loss theory, an effective attenuation pole of order not smaller than $3/2$.

While most crystal filters particularly those for telephone carrier systems have been designed on a lattice basis, crystal filters of the ladder type composed of crystal units and capacitors have also been used for designs where percentagewise the bandwidth need not be as high as the bandwidth required for conventional carrier systems. Such ladder type crystal filters where the narrower relative bandwidth can still be useful for higher frequency applications are considered for instance in the article by R. A. Sykes, published on pages 18–29 of the 1958 IRE National Convention Record, Part 2.

Figure 8:
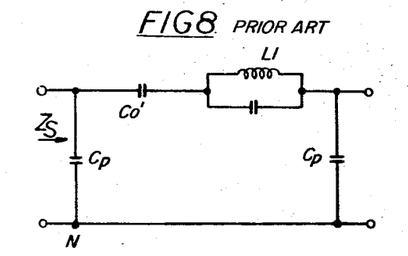
FIG. 8, a $\pi$-section with an equivalent crystal structure in the series branch and capacitances in the two shunt branches.
Figures 9, 10:
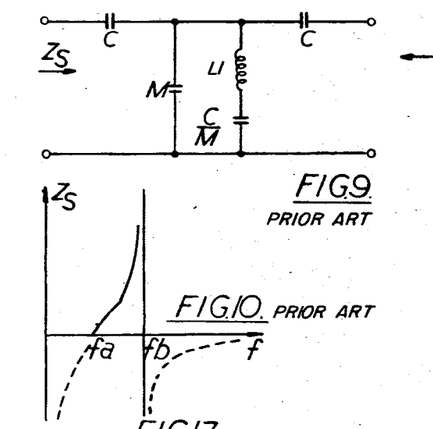
FIG. 9, a T-section with an equivalent crystal structure in the shunt branch and capacitances in the two series branches.
FIG. 10, the image impedance characteristic of the sections of FIGS. 8 and 9.
Figure 11:
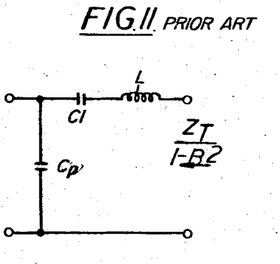
FIG. 11, a terminating half section permitting to transform the image impedance of FIG. 10 into that of FIG. 2.
Figure 12:
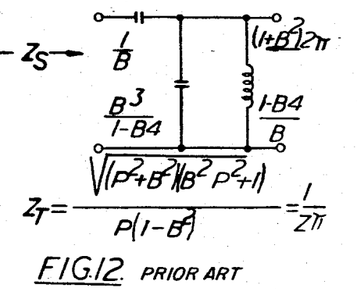
FIG. 12, a terminating half section permitting to transform the image impedance of FIG. 10 into that of FIG. 3.

FIGS. 8 and 9 represent ladder type filter sections and FIGS. 11 and 12 half sections which may be useful in designing crystal filters. It will be recognized that the $\pi$-section of FIG. 8, apart from the two shunt capacitors, includes a series dipole consisting of two capacitors and an inductance like the structure of a crystal filter unit shown in FIG. 6. This dipole structure is also to be found in its alternate equivalent form as the shunt arm of the T-section of FIG. 9, two capacitors constituting the series arms. Whereas the section of FIG. 8 exhibits an infinite attenuation pole at a frequency $f_1$ in the upper stopband above the passband ($f_1>f_b$), the filter section of FIG. 9 produces an infinite attenuation pole when the frequency $f_1$ is in the lower stopband below the passband ($f_a>f_1$). These two sections shown in FIGS. 8 and 9 both exhibit the same type of image impedances $Z_s$ at both ends. For symmetrical sections, where the two capacitors forming the shunt branches of FIG. 8 and those forming the series branches of FIG. 9 are equal to one another, the image impedance $Z_s$ has the value equivalent to $$\frac{1}{P}\sqrt{\frac{P^2+B^2}{1+B^2P^2}}$$

The frequency parameter P is an imaginary frequency parameter normalized with respect to the midband frequency, i.e. the geometric mean between the two frequencies $f_a$ and $f_b$ defining the limits of the passband. More specifically, P is equal to $$\frac{jf}{\sqrt{f_af_b}}$$

The image impedance $Z_s$ is also defined in terms of a parameter B which is equal to the square root of the ratio between the lower ($f_a$) and the higher ($f_b$) frequency limits of the passband. As defined, $Z_s$ is normalized with respect to its value at the midband frequency so that $Z_s$ is equal to unity when P is equal to $j$.

The four circuit parameters of the symmetrical circuits of FIGS. 8 and 9 can also be expressed in terms of $f_a$, $f_b$ and $f_1$ the infinite attenuation frequency to which the anti-resonant or resonant circuit is tuned. Using the auxiliary dimensionless parameters $M_c$ and $N$ where $$M=\frac{f_1^2(f_b^2-f_a^2)}{2(f_a^2-f_1^2)(f_b^2-f_1^2)}$$

and $$N=\frac{2B\sqrt{(f_a^2-f_1^2)(f_b^2-f_1^2)}}{f_b^2-f_a^2}$$

as well as the normalized value of the pair of equal shunt (FIG. 8) or series (FIG. 9) capacitors. FIG. 8, $$C_{o1}=\frac{f_1^2}{Nf_af_b}, \quad C_f=B\sqrt{\frac{f_b^2-f_1^2}{f_a^2-f_1^2}}$$

$$L_1=\frac{f_af_b}{M_cf_1^2}$$

in FIG. 9, $$L_1=\frac{Mf_af_b}{Cf_1^2}$$

The expressions given are dimensionless inductance or capacitance values which correspond to a normalized image impedance $Z_5$ equal to unity at the midband frequency.

FIG. 10, shows the shape of the image impedance $Z_s$ in function of frequency. Contrary to FIGS. 2 and 3, the shape of the $Z_s$ characteristic is not adapted to suitably match resistive terminations. Inside the passband where the image impedance is resistive it goes from zero at the lower limit $f_a$ to infinity at the upper limit $f_b$ of the passband, the reactive image impedance outside the passband is capacitive both below and above the latter. To transform the image impedance $Z_s$ afforded by the sections of FIGS. 8 and 9 into image impedances of the $Z_T$ or $Z_\pi$ type shown in FIGS. 2 and 3 respectively, the half sections shown in FIGS. 11 and 12 respectively may be used. These include merely a series resonant circuit in the terminating series branch as in FIG. 11 or an anti-resonant parallel circuit in the terminating shunt branch as in FIG. 12, the other element being again a capacitor as for the sections of FIGS. 8 and 9. As shown, the half section of FIG. 11 will permit to transform an image impedance of the $Z_S$ type into one of the $Z_T$ type, save for a constant factor function of B. The expressions for the image impedances $Z_T$ and $Z_\pi$, again normalized with respect to their values at midband frequency and the product of which is equal to unity, shown in FIGS. 11 and 12. As shown, the half sections of FIGS. 11 and 12 provide the impedances $$\frac{Z_T}{1+B^2}$$

and $(1+B^2)Z_\pi$ respectively. The values of the three circuit elements of the half-sections of FIGS. 11 and 12 are given on the figures in function of B. In FIG. 11

$$C_1 = \frac{1-B^4}{B^3}$$

$$L_1 = \frac{B}{1-B^4}$$

$$C_P = B$$

and in FIG. 12

$$C_1 = \frac{1}{B}$$

$$C_p = \frac{B^3}{1-B^4}$$

$$L_p = \frac{1-B^4}{B}$$

Again, as for the elements of FIG. 9, the expressions given are dimensionless inductance or capacitance values which correspond to a normalized image impedance $Z_S$ at the left-hand side which is equal to unity at the midband frequency.

An interesting result of the addition to the sections of FIGS. 8 or 9 of an impedance transformation section of the type shown in FIG. 11 or 12 is also that the values of the capacitors such as C in FIG. 8, will now be increased by the addition of the capacitor B of the half section of FIG. 11. Indeed, these two shunt capacitors will now form a single capacitor of normalized value $B+C$ when the half section of FIG. 11 is combined with the full section of FIG. 8. With two such half sections as those of FIG. 11 on each side of the full section of FIG. 8, the two shunt capacitors now have their value increased from C to $B+C$. As shown by the value of these two dimensionless parameters, C will usually be much smaller than B since the infinite attenuation frequency $f_1$ to which the anti-resonant circuit of FIG. 8 is tuned in much closer to $f_b$, as it is in the upper stopband, than it is to $f_a$, the lower limit of the passband. This increase of the effective shunt capacitances from C to $B+C$ is of particular usefulness in connection with the realization by means of crystals since when transforming the symmetrical $\pi$-section of FIG. 8, but with the increased shunt capacitor values $B+C$, into a lattice section or its bridge type equivalent, the equivalent crystal arm or arms having the same structure as the series branch of FIG. 8, will have an additional capacitance $$\frac{B+C}{2}$$

across it and for a given bandwidth, this will help towards the realization of the structure of the type corresponding to the series branch of FIG. 8, by means of a crystal which, as previously mentioned, have an equivalent circuit with a capacitance in shunt across a series resonant circuit and having a very large value as compared to the capacitance of the series resonant circuit.

Substantially the same considerations are applicable mutatis mutandis to the case of a full section as shown in FIG. 9 terminated by half sections of the type of FIG. 12, since this time C is large as $f_1$ is closest to $f_a$ as the infinite attenuation frequency is now located in the lower stopband. Serial combination of C with $1/B$ will produce a capacitance $$\frac{C}{1+BC}$$

of reduced value and when transforming into a lattice or equivalent structure, this will again tend to facilitate the realizability of the structure using crystals.

As will be shown later, realization by means of crystals will also be facilitated if sections of the type of FIG. 8 are combined with half sections of the type of FIG. 12 or alternatively, sections of the type of FIG. 9 are combined with half sections of the type of FIG. 11.

Figure 13:
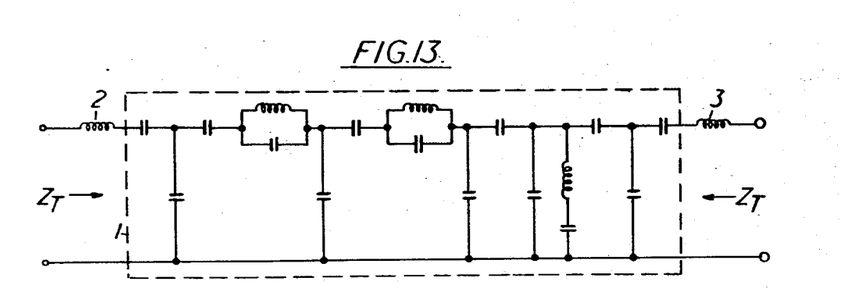
FIG. 13, a composite filter structure using several of the sections of FIGS. 8, 9 and 11.

FIG. 13 shows a composite filter with image impedances of the $Z_T$ type at both ends. Such ladder structures can be composed by means of symmetrical sections of the type of FIGS. 8 and 9 which have the same image impedances plus two half sections of the type shown in FIG. 11, one at each end of the filter. It will be recognized by comparing FIG. 13 with FIGS. 8, 9 and 11, that the composite structure of FIG. 13 is made up of two sections such as shown in FIG. 8, one section of the type of FIG. 9, plus the two end sections shown in FIG. 11. Since the overall structure of FIG. 13 is symmetrical and as the two terminating series inductances 2 and 3 at each end have the same value, since the same half sections are used, the quadripole 1 inside the dotted line rectangle is necessarily symmetrical. This means that it can be realized with the help of a lattice structure of the type of FIG. 4 whose two impedances $Z_1-pL$ and $Z_2-pL$ can be seen from FIG. 13 to be capacitive at low frequency as well as at high frequency and have accordingly the structure required for realization by means of crystals and capacitors only as discussed above.

Thus, it has been shown that ladder type sections including dipole branches having the structure of a crystal unit can be used not only for designing ladder type crystal filters with relatively reduced bandwidth as discussed in the second article mentioned above, but as explained in relation to FIG. 13, they can also be used to finally realize lattice filters where the impedances have the required structure for realization by means of crystal units and capacitors only, providing additionally capacitance ratios $C_{o1}/C_1$ (FIG. 6) of much higher values than the corresponding ratios for the filter units included in the ladder structure. Hence, starting from ladder type $\pi$- or T-sections, it is possible to design relatively wideband crystal filters of the lattice type, and not merely relatively narrow band filters of the ladder type. Using only sections of the type shown in FIGS. 8 and 9, it can be shown that the capacitance ratio $C_{01}/C_1$ (FIG. 6) thus obtainable is of the order of $$\frac{1}{b} = \frac{B}{1-B^2}$$

i.e. the inverse of the relative bandwidth $b$, while this capacitance ratio becomes of the order of $1/b^2$ for filters containing two half sections of the type shown in FIGS. 11 and 12.

Evidently, while FIG. 13 shows a composite filter with image impedances of the $Z_T$ type, a composite filter with image impedances of the $Z_\pi$ type could also be secured by using terminating half sections of the type shown in FIG. 12.

While it has been shown that image parameter crystal lattice filters can be obtained by first composing an equivalent ladder filter such as that of FIG. 13 by means of sections of the type shown in FIGS. 8 and 9, together with terminating half sections of the type of FIG. 11, or of the type of FIG. 12, such filters can also be calculated by means of the insertion loss method. As mentioned previously, an insertion loss pole at infinite frequency of order not smaller than 3/2, or a similar pole of order not smaller than 3/2 at zero frequency has in this case to be included, since a similar insertion loss pole is also present if the calculation is based on the image parameter theory.

Considering the network of FIG. 13 at infinite frequency, it provides an insertion loss pole of order 3/2 since the network of FIG. 13 then becomes equivalent to a T-network comprising the two series inductances 2 and 3 outside the central quadripole 1 which can then be taken as a simple shunt capacitance. By a similar reasoning, the filter of FIG. 13 is seen to exhibit one pole of order 1/2 at zero frequency. Also, the two sections of FIG. 8 will provide two infinite attenuation poles in the upper stopband, while the section of the type shown in FIG. 9 will provide an infinite attenuation pole in the lower stopband. If it is assumed that the filter of FIG. 13 has been calculated as a symmetrical insertion loss filter, the two terminating series inductances 2 and 3 are still of like value since the input impedances on either side are still defined by these inductances alone at infinite frequency. The quadripole 1 is thus still symmetrical and an equivalent lattice section therefore always exists as in the case of the image parameter filter and it will have the structure required for realization by means of crystals and capacitors. That the element values will also in general be suitable for such a realization follows from the known fact that the orders of magnitude of the element values in an insertion loss design do not in general, differ from those in a similar image parameter design.

With the above introductory part of the detailed description in mind, it will now be shown how new and interesting structures may be obtained and this by way of a first example.

Referring again to FIGS. 8 to 12, the simplest way to obtain a filter of the normalized $Z_T$ image impedance type, starting from a section of the type shown in FIG. 8, is to use that section between two terminating half sections of the type shown in FIG. 11. In this way, the structure of FIG. 14 will be obtained, but the number of capacitors of this structure can be reduced by eliminating the two outer series capacitors. This can be achieved by applying Norton transformations which are often used in filter and particularly bandpass filter designs as referred to for instance in the second article mentioned above where FIG. 11 particularly shows the Norton impedance transformations which permit to transform a shunt capacitor into a T-network of capacitors in cascade with an ideal transformer, or alternatively a series capacitor into a $\pi$-network of capacitors in cascade with an ideal transformer, or yet by a double application of the series and shunt Norton transformation, it is still possible to transform an inverted L-network composed of a shunt and of a series capacitor into an equivalent inverted L-network of two capacitors in cascade with an ideal transformer, but with the series capacitor facing the other way.

Figure 14:
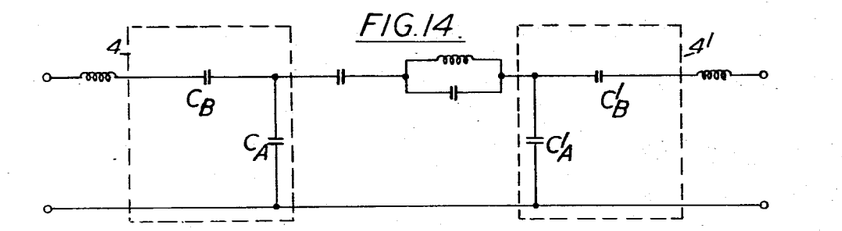
FIG. 14, a section as shown in FIG. 8 surrounded by two half sections as shown in FIG. 11.
Figure 15:
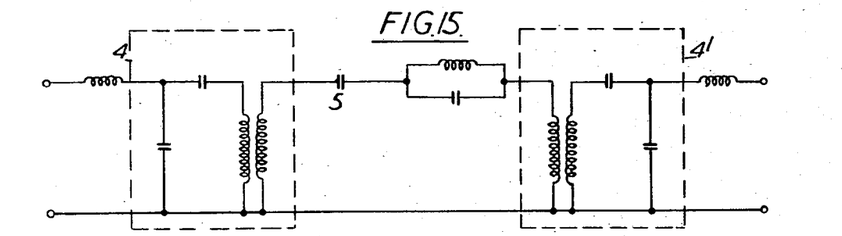
FIG. 15, the circuit of FIG. 14 after the application of two Norton transformations.

Thus, considering the network of FIG. 14 which already integrates the shunt capacitors of the terminating half sections of FIG. 11 with those of the section shown in FIG. 8, and applying the double impedance transformation just mentioned to the inverted L-network 4 formed by the shunt capacitor $C_A$ with the series capacitor $C_B$, as well as a like transformation to the similar network 4' formed by the shunt capacitor $C_A'$ with the series capacitor $C_B'$, the network of FIG. 14 will become that of FIG. 15, where the networks 4 and 4' are rigorously equivalent to the like numbered networks shown in FIG. 14. Clearly, from FIG. 15 it is then apparent that the capacitors $C_B$ and $C_B'$ in series with the outer inductances and shown in FIG. 14 have now been eliminated. Also, the ideal transformers which are included in 4 and 4' (FIG. 15) by virtue of these transformations, may be omitted by suitably transforming the impedances in accordance with the ratios indicated next to the transformers and which correspond to the voltage ratios. In this way, the series capacitors of value $$\frac{C_B^2}{C_A + C_B}$$

part of 4 and 4' should have their values changed to $C_A + C_B$ after elimination of the ideal transformers and these two series capacitors are readily eliminated since they can be combined with capacitor 5 of the central series branch. Thus, the final structure is of the type shown in FIG. 16 and the normalized image impedances are of the $Z_T$ type.

In a similar manner, a seven-element structure analogous to that of FIG. 16 can also be obtained from the section of FIG. 9 in which the infinite attenuation pole is located below the passband. When the section of FIG. 9 is associated with two end sections of the type shown in FIG. 11, the resultant structure of FIG. 17 is obtained, which like that of FIG. 16 also has image impedances of the $Z_T$ type. But though the structure of FIG. 17 may fulfill exactly the same function as the section of FIG. 17, but this time when an infinite attenuation pole is required below the bandpass instead of above, and though the number of elements is the same in both structures, they are of somewhat different configuration since that of FIG. 17 is a three-arm ladder structure whereas that of FIG. 16 is a five-arm one.

Figure 18:
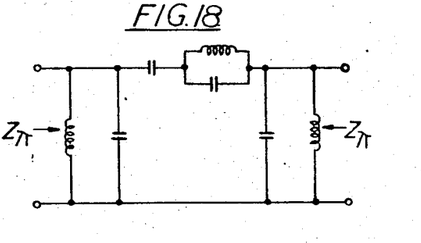
FIG. 18, a section corresponding to that of FIG. 16 when the terminating half sections are of the $Z_\pi$ type.
Figure 19:
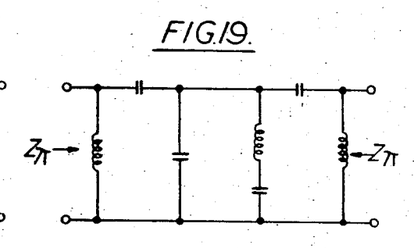
FIG. 19, a section corresponding to that of FIG. 17, but with the image impedances of the $Z_\pi$ type.

FIGS. 18 and 19 may respectively be obtained by combining a section of the type shown in FIG. 8 with two half terminating sections of the type shown in FIG. 12 in order to secure a section having image impedances of the $Z_\pi$ type. The structure of FIG. 19 will be obtained by combining the section of FIG. 9 with the two terminating half sections of FIG. 12, again to obtain a structure with image impedances of the $Z_\pi$ type. This time it is the structure of FIG. 19, with an infinite attenuation pole above the passband which, like the structure of FIG. 16 is a five-arm structure.

The structure of FIGS. 16 to 19 are thus symmetrical ladder sections exhibiting either the $Z_T$ or the $Z_\pi$ image impedance characteristic which is substantially more desirable than the $Z_S$ image impedance characteristic, and these symmetrical ladder sections can evidently be transformed into lattice sections which will either end with series inductances in the manner shown in FIG. 4 or with shunt inductances as shown in FIG. 7.

Figure 16:
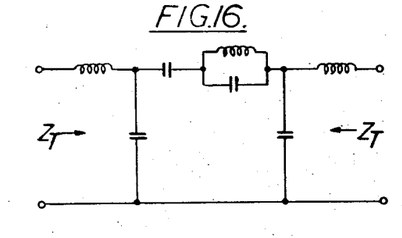
FIG. 16, the structure of FIG. 14 as a result of the transformations shown by FIG. 15.
Figure 17:
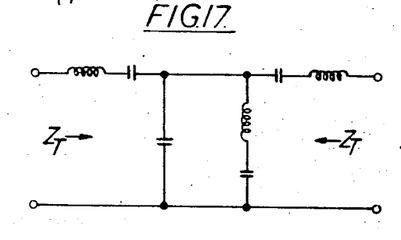
FIG. 17, a structure like that of FIG. 16 but obtained from the original section of FIG. 9 instead of that of FIG. 8.
Figure 20:
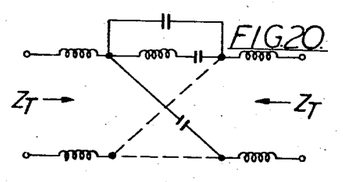
FIG. 20, the lattice equivalent of FIG. 16 or FIG. 17.
Figure 21:
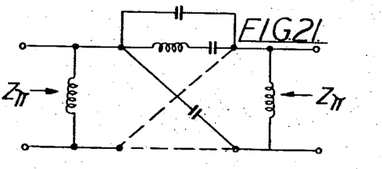
FIG. 21, the lattice equivalent of FIG. 18 or FIG. 19.

FIGS. 20 and 21 respectively show the lattice structures which can be obtained either from FIG. 16 or 17, or alternatively from FIG. 18 or 19.

As well known, and as disclosed for instance in the first above mentioned reference the lattice sections can be transformed into equivalent hybrid transformer bridge sections or Jaumann sections and in particular the structure with the $Z_\pi$ image impedance type can be eadily transformed without requiring an additional coil.

Figure 22:
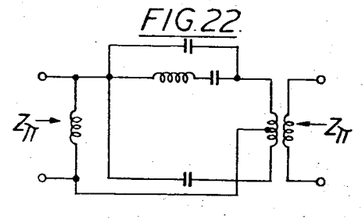
FIG. 22, the hybrid transformer equivalent of FIG. 21.

FIG. 22 shows the hybrid transformer bridge section or Jaumann section equivalent to the lattice section shown in FIG. 21.

The sections of FIGS. 16 to 19 as well as their equivalent forms of FIGS. 20 to 22 present the image impedances $Z_T$ or $Z_\pi$. They can easily be combined with one another as well as with any other suitable passband section well known in the art and not specifically mentioned in this description. In this way, an extremely large variety of possible bandpass filters can be obtained. Such filters may comprise any number of sections in tandem, some of them containing one or more crystals in a lattice or its hybrid transformer bridge equivalent, others containing crystals in ladder configuration as disclosed in the second article mentioned above and still others containing only reactances composed of coils and capacitors in simple ladder configurations.

The ladder-lattice transformation introduced in order to secure a sufficiently high capacitance ratio $C_{oi}/C_i$ (FIG. 6) so that the impedance dipole may be realized by one or more crystal units in a relatively wide bandpass filter, may sometimes be postponed with advantage until after the complete composite ladder filter has been obtained.

Figure 23:
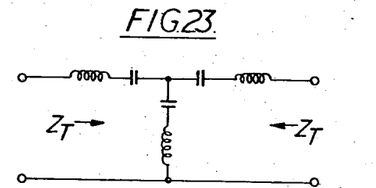
FIG. 23, a constant-K bandpass T-section using series resonant circuits in each branch.

FIG. 23 shows a conventional three-branch T-section with $Z_T$ image impedances and using a series resonant circuit in each of the branches. Two such sections producing infinite attenuation poles at frequencies $f_1$ and $f_2$ might be used in their balanced versions in conjunction with the structure shown in FIG. 16 in order to build a composite filter.

Figure 24:
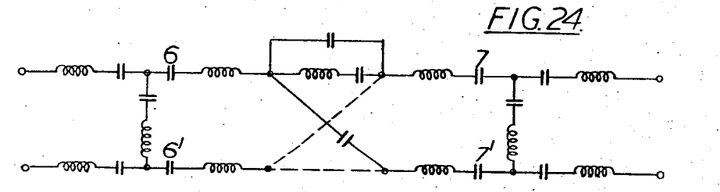
FIG. 24, the combination of the lattice section of FIG. 20, with two balanced sections each corresponding to the unbalanced section of FIG. 23 on each side.

FIG. 24 shows the composite bandpass filter which is obtained in this manner by using the lattice equivalent of FIG. 16 and which is shown in FIG. 20, this lattice equivalent being inserted between the two sections of the type shown in FIG. 23. This figure shows that only the four outer series inductances of the lattice equivalent of FIG. 20 can be obtained with inductances included in the series arms of the T-sections of FIG. 23 which must of course, be transformed into H-type sections prior to being cascaded with the lattice section, in order to keep a balanced structure with respect to ground. Moreover, the capacitors 6, 6' or 7, 7' are only due to the capacitors included in the sections shown in FIG. 23, the values of these capacitors 6–6' and 7–7' in the H-sections being evidently equal to twice the values of the series capacitors part of the T-sections of FIG. 23. On the other hand, it can be shown that by postponing the transformation of the latter structure of FIG. 16 into the lattice section of FIG. 20, not only can the number of the total elements in the final structure be reduced, but it will be possible to secure even better filter bandwidths since capacitors of smaller values than the series capacitors 6, 6', 7 and 7' will become associated with the final lattice section. Indeed, it is of interest to be able to associated shunt capacitors outside a lattice section and which have the highest value since shunt capacitors of like value appearing on each side of a lattice can be integrated in shunt across the arms of the lattice by virtue of Mason's theorem and according to the added capacitance value will render at least one of these lattice impedances more readily realisable as a crystal unit by virtue of the capacitance ratio, $C_{oi}/C_i$ becoming larger and producing relatively greater bandwidth. The reasoning for series capacitors of low values included on each side of a lattice section is quite similar and such series capacitors also permit to increase the above mentioned ratio.

Figure 25:
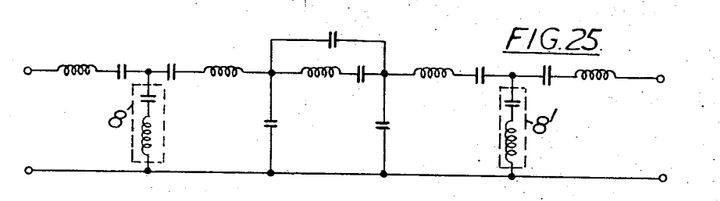
FIG. 25, an unbalanced electrical equivalent of the balanced structure of FIG. 24.

FIG. 25 shows the composite unbalanced ladder structure equivalent to the balanced structure of FIG. 24, and obtained when the five-arm ladder structure of FIG. 16, and not its lattice equivalent of FIG. 20, is inserted between two ladder sections of the type shown in FIG. 23. As for the balanced version of FIG. 24, in the unbalanced filter structure of FIG. 25, merely the series inductances of the structure of FIG. 16 can be combined with the inner series inductances of the end T-sections of FIG. 23. But, the network of FIG. 25 can still be further transformed by way of Norton's transformations.

Figure 26:
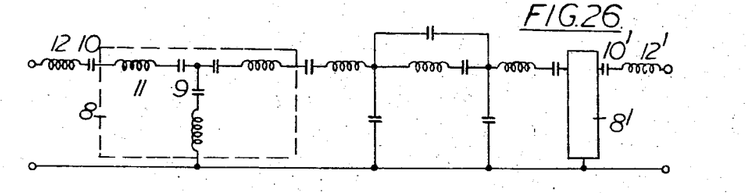
FIG. 26, a structure equivalent to that of FIG. 25 and showing the application of two Norton transformations.

FIG. 26 shows the structure which can be obtained from FIG. 25 by transforming the series resonant shunt circuits 8 and 8' by using Norton's transformation which is of course, applicable not merely to a simple capacitor or other element but quite generally to any impedance. Thus FIG. 26 shows that each of the shunt impedances 8 or 8' has been transformed into a T-network of such impedances in association with an ideal transformer of arbitrary ratio. This arbitrary transformation ratio intervenes as a parameter in the values of the elements of the T-network as shown for instance in the second reference mentioned above, and it will be possible to select this ratio in such a manner that the capacitor 9 has a negative value exactly equal in magnitude to the positive value of capacitor 10, so that the two in series can be replaced by a short-circuit. The transformation ratio for the network 8', the details of which are not shown, may also be chosen so that the capacitors 9' (not shown) and 10' cancel one another. Alternatively, the transformation ratios may be so chosen that this time the inductance 11 is negative and has a magnitude exactly equal to that of the inductance 12, whereby these two series inductances produce a short-circuit. Likewise, the transformation ratio for the network 8' may be chosen so as to produce the cancellation of the indutcances 11' (not shown) and 12'. Yet another possibility is that in one of the two networks 8 or 8', the transformation ratio is chosen so as to eliminate the outer series capacitor whereas in the other network 8', the transformation ratio is chosen so as to eliminate the outer series inductance.

Assuming for instance that both the infinite attenuation poles at the frequencies $f_1$ and $f_2$ produced respectively by the two sections of the type shown in FIG. 23 are in the lower stopband, then as disclosed by V. Belevitch in his article published on pages 59–65 of Electrical Communication, March 1947, the two outer series inductances may be eliminated by a sutiable choice of the transformation ratios introduced by passing from FIG. 25 to FIG. 26 and accordingly, the structure of FIG. 27 obtains in this case, 13 in this figure representing an ideal transformer which will generally remain as a result of the transformation.

Figure 27:
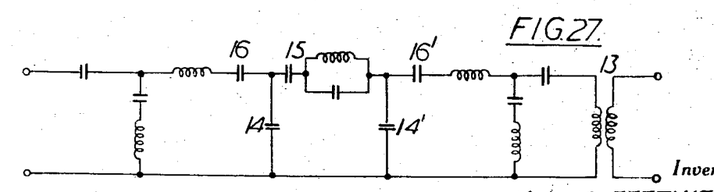
FIG. 27, the structure equivalent to that of FIG. 25 and resulting from the Norton transformations illustrated by FIG. 26.

FIG. 27 however, shows a network which can be further transformed by operating further Norton transformations on the capacitor combinations 14–16 and 14'–16', as already shown in FIG. 15, with the result that additional positive capacitances appear in series with the series capacitor 15 whereas on the other hand the Norton transformations will cause the capacitors 16 and 16' to be eliminated.

Figure 28:
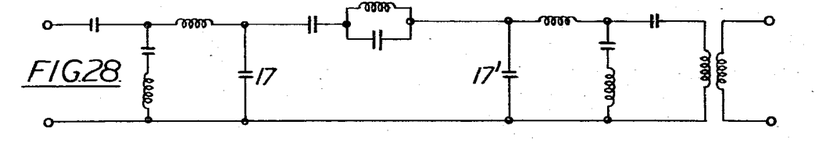
FIG. 28, a further structure equivalent to that of FIG. 27 and resulting from two further Norton transformations.

FIG. 28 shows the resultant structure which will be obtained in this manner. In this structure, the central shunt capacitors 17 and 17' will generally turn out to be of different values but by splitting the shunt capacitor of higher value into two partial capacitors of which one has a value equal to that of the other shunt capacitor on the other side of the central series branch, the central π-section of the network of FIG. 28 will then be symmetrical and it can therefore be transformed into a lattice equivalent.

Figure 29:
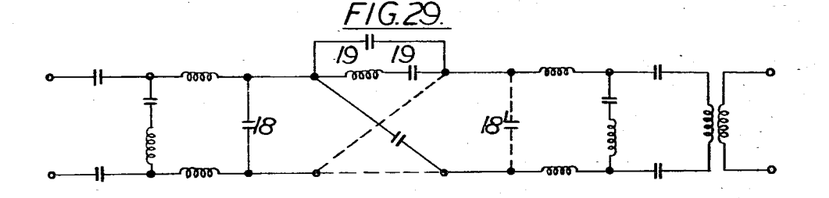
FIG. 29, the balanced equivalent of FIG. 28 using a lattice section.

FIG. 29 shows the structure of the network which is finally obtained, shunt capacitor 18 having a value equal to the difference between the capacitance values of capacitors 17 and 17' in FIG. 28, assuming that the former has the larger value. If the contrary is true, of course capacitor 18 would be replaced by capacitor 18' shown within a dotted line connection in FIG. 29. In this figure, two of the lattice section branches have the configuration of the equivalent cricuit of a piezoelectric crystal and the ratio between the values of the capacitances 19 and 19' turns out to be more advantageous than the corresponding ratio for the crystal units of the filter shown in FIG. 24. Thus, the filter of FIG. 29 not only uses less elements than that of FIG. 24 but the values of the elements will be such that wide relative band-widths can be realized.

Another simple way illustrating the type of advantages which can be obtained by postponing the ladder-windings transformations is the following. Taking two structures of the type of FIG. 16 in tandem, the resulting symmetrical structure has the appearance shown in FIG. 30.

Figure 30:
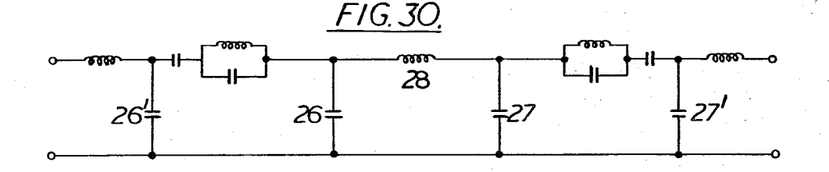
FIG. 30, the combination of two sections of the type shown in FIG. 16 in cascade.
Figure 31:
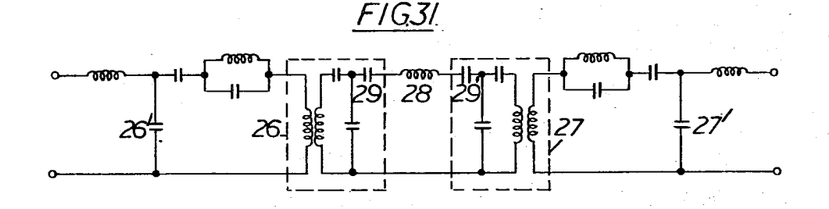
FIG. 31, an electrical equivalent of the circuit of FIG. 30 showing how the application of suitable Norton transformations may produce improved results.

In FIG. 30, the two central shunt capacitors 26 and 27 can be replaced by respective T-networks of capacitors in cascade with an ideal transformer and the two transformation ratios thus introduce two degrees of freedom into the network. One will be lost by taking such a relation between the two Norton transformation ratios that the capacitors introduced in series with inductance 28 cancel one another, but there is still one additional degree of freedom left and this may be used to advantage. One possibility for instance would be to make equal to one another the inductances of the two lattice sections obtained after the ladder-lattice transformations have been performed on the network of FIG. 30. In this case the capacitor 26 would no longer necessarily be equal to capacitor 26' and likewise capacitor 27 would no longer necessarily be equal to capacitor 27', but as discussed in relation to FIGS. 28 and 29 this would still permit the transformations, leaving excess shunt capacitors at one end of the lattice. In this case it is assumed of course, that the two structures of the type shown in FIG. 16 and which were put in tandem were not equivalent to one another and in particular that their outer series inductances were of different values, which values will finally turn out to be alike by the transformations just discussed in relation with FIG. 30 and illustrated in FIG. 31 where the two transformation ratios are so chosen that the capacitors 29 and 29' are of equal but opposite values, one being negative, while there remains a degree of freedom for the choice of the values of the two outer series inductances.

It will now be shown that apart from the filter structures discussed above by way of example and involving as part of the structures the circuits shown in FIGS. 16 to 19, an even greater variety of bandpass filter structures of useful properties, particularly in relation to the relative bandwidth which can be obtained, may be built by incorporating additional sections which are of the antimetrical type.

Figure 32:
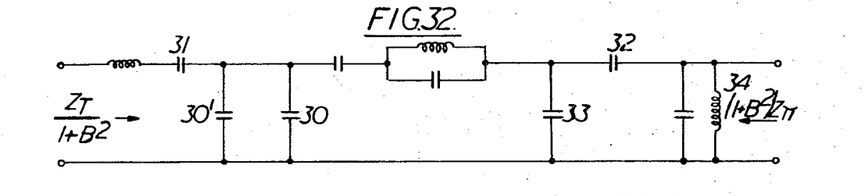
FIG. 32, a combination of the section of FIG. 8 with a terminating half section as shown by FIG. 11 on the one side and a terminating half section as shown by FIG. 12 on the other.

FIG. 32 shows a structure of the antimetrical type which is obtained by combining a section of the $Z_S$ type shown in FIG. 8 with a terminating half section of the type shown in FIG. 11 at the left-hand side and with a terminating half section of the type shown in FIG. 12 at the right-hand side.

The structure of FIG. 32 in which the capacitors 30 and 30' combine with one another in an obvious manner, can be simplified to reduce the number of elements in a variety of ways, one of the simplest consisting in applying the double Norton transformation previously referred to, to the inverted L-network formed by the series capacitor 31 together with the shunt combination of the capacitors 30 and 30', as well as a like transformation of the combination formed by the series capacitor 32 and the shunt capacitor 33.

Figure 33:
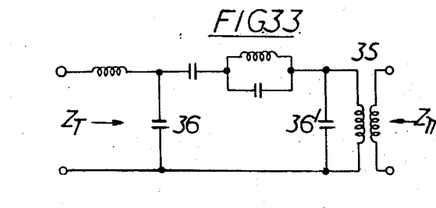
FIG. 33, the circuit of FIG. 32 after elimination of an excess element.

FIG. 33 shows the resultant structure which can be obtained in this manner, with an image impedance of the $Z_\pi$ type on the right-hand side, the inductance 34 of FIG. 32 having now become the transformer 35 due to the double Norton transformations having introduced two ideal transformers which can finally result into the transformer 35, after being combined with the shunt inductance 34.

The antimetrical section of FIG. 33 has image attenuation poles of order ½ both at zero and infinite frequency, and an image attenuation pole of order 1 at an arbitrary frequency in the upper stopband of the bandpass filter.

Figure 34:
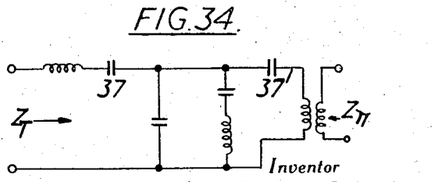
FIG. 34, a dual structure to that of FIG. 33 produced by starting from the section of FIG. 9 instead of that of FIG. 8.

FIG. 34 shows a corresponding structure with an image attenuation pole of order 1 in the lower stopband of the filter and obviously this structure will be obtained by using the section of FIG. 9 with the terminating half section of FIG. 11 on its left and the terminating half section of FIG. 12 on its right.

Both in the case of the antimetrical section shown in FIG. 33 and for that shown in FIG. 34, it is possible to transform them into equivalent forms using a lattice section though in general, after the Norton transformation described above to reach the structures of FIG. 35 or 36, the shunt capacitors 36 and 36' in FIG. 35 or the series condensers 37 and 37' in FIG. 36 will not generally be equal to one another although the difference between the two may turn out to be small if the bandwidth of the filter is small. Nevertheless, as previously explained in connection with FIGS. 28 and 29, an excess shunt capacitor in the case of FIG. 33 or an excess series capacitor in the case of FIG. 37 can be extracted to leave either two shunt capacitors of equal value, one of these, e.g. 36, being however, in parallel with an additional capacitor 38 (FIG. 35), or alternatively leaving capacitors 37 and 37' of equal value but with capacitor 37 in series with an additional capacitor 39–40 (FIG. 36).

Figure 35:
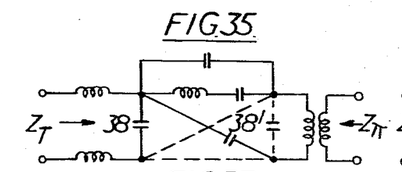
FIG. 35, the lattice equivalent of the circuits shown in FIGS. 33 and 34.
Figure 36:
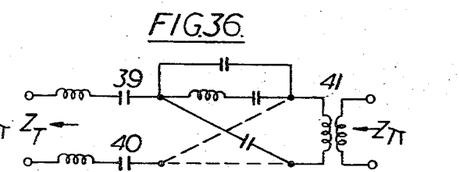
FIG. 36, another lattice equivalent of the circuits shown in FIGS. 33 and 34.

FIGS. 35 and 36 show circuits equivalent to those of FIGS. 33 and 34 in case the left-hand capacitor 36 of FIG. 33 has a value in excess of that of capacitor 36' by an amount corresponding to the capacitance 38 shown in FIG. 35, whereas in a like manner, FIG. 36 corresponds to the case where the value of capacitance 37 in FIG. 34 is smaller than the capacitance of 37' by an amount such that the series capacitors 39 and 40 of equal value and shown in FIG. 36, when placed in series with a capacitor having the same value as that of 37', will produce an equivalent capacitor having the same capacitance value as that of 37.

FIG. 35 shows as an alternative the shunt capacitor 38' connected in dotted line on the right-hand side of the lattice in case the capacitance of 36' (FIG. 33) exceeds that of 36. Likewise, the series capacitors 39 and 40 of FIG. 36 would be located on the right-hand side of the lattice, i.e. directly in series with the primary winding of transformer 41 if the capacitance of 37 (FIG. 36) is larger than that of 37' (not shown).

Also, while the structure of FIG. 35 has been shown to be derived from that of FIG. 33, it might also be derived from the bandpass structure shown in FIG. 34, in which in contradistinction with that of FIG. 33, the frequency of infinite attenuation is located in the lower stopband instead of in the higher stopband. This transformation of the structure of FIG. 34 into one of those shown by FIG. 35 can take place by the application of a Norton transformation to whichever has the smaller capacitance out of the series capacitors 37 and 37'. Assuming this to be capacitor 37, an equivalent arrangement to that shown in FIG. 34 is represented in FIG. 37.

Figure 37:
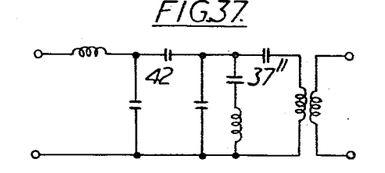
FIG. 37, the structure of FIG. 34 after the application of a Norton transformation.

In FIG. 37, the Norton transformation ratio can be selected, by a suitable choice of the ideal transformer (not shown) ratio, so that capacitor 42 has the same value as capacitor 37'' whereby these two series capacitors and the shunt dipole between them form a symmetrical section of the type shown in FIG. 9 and which can readily be transformed into a lattice section so that the structure of FIG. 37 can be transformed into that of FIG. 35. Obviously, the excess capacitor 38' will be obtained if the right-hand capacitor 37' in FIG. 34 has a smaller value than capacitor 37.

Likewise, though the structure of FIG. 36 and its alternative (not shown) with the capacitors 39 and 40 displaced to the right of the lattice, were obtained as discussed above from the structure of FIG. 34, they may also be obtained when the frequency of infinite attenuation is located in the upper stopband, i.e. from the structure shown in FIG. 33. Assuming that capacitor 36 for instance has a larger value than capacitor 36', a Norton transformation can be applied to this capacitor 36 to obtain the equivalent network of FIG. 38.

Figure 38:
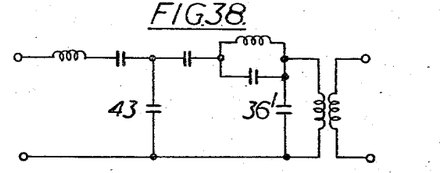
FIG. 38, the structure of FIG. 33 after the application of a Norton transformation.

In FIG. 38 by a suitable choice of the ideal transformer (not shown) ratio, shunt capacitor 43 has the same capacitance as that of 36", with the result that the section involving the two shunt capacitors 43 and 36" as well as the series dipole interconnecting them and which has the same structure as the symmetrical structure of FIG. 8, can be transformed into a lattice so that the network of FIG. 33 finally becomes that of FIG. 36. Obviously, the series capacitors 39 and 40 would be displaced to the right of the lattice if the righthand shunt capacitor 36' happened to have a larger value than the lefthand one 36 (FIG. 33).

Thus, the antimetrical structures of FIGS. 35 and 36 ending with a series coil on one side and with a shunt coil on the other and incorporating a crystal unit lattice section, may be used irrespective of the location of the infinite attenuation pole in the lower or upper stopband. One of the lattice arms in each of the sections shown in FIGS. 35 and 36 has the same configuration as that of a crystal and it may be shown that the element values obtained in practice are of the same order of magnitude as those obtained for the symmetrical sections of FIGS. 20 and 21. Thus the antimetrical sections of FIGS. 35 and 36 will permit to realize yet a wider variety of crystal filters.

Though antimetrical crystal filters may have advantages, the sections of FIGS. 35 and 36 need not necessarily be used in antimetrical filters since for instance, by combining two sections of the type shown in FIG. 35 back to back (not shown), a symmetric bandpass filter with $Z_\pi$ or $Z_T$ type image impedances can be obtained, the $Z_\pi$ type offering the advantage that the crystal sections are surrounded by two transformers.

Between the sections of FIG. 35 and those of FIG. 36, preference will usually be given to the former since it is easier to take the parasitic capacitances into account Moreover, for both the sections of the type shown in FIG. 35, i.e. with the excess capacitor 38 or 38', there is always an equivalent hybrid transformer section which does not involve an additional coil, whereas this is only true for the section of FIG. 36 with the series capacitors 39 and 40 on the left of the lattice as shown.

The hybrid transformer can be avoided altogether and the sections of FIGS. 33 and 34 can also always be transformed into bridge type sections, using two capacitors in series instead of the hybrid transformer. Even with unequal capacitors 36—36' or 37—37', this transformation is possible since it will merely involve an ideal transformer.

Figure 39:
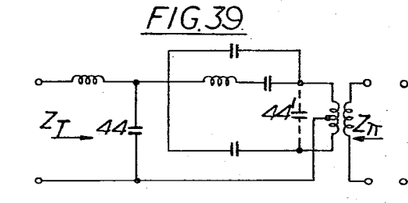
FIG. 39, a hybrid transformer structure equivalent to that of FIG. 35.
Figure 40:
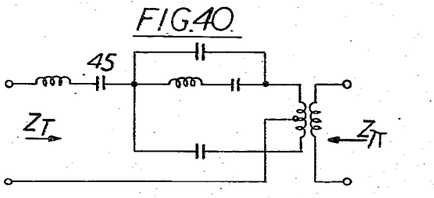
FIG. 40, a hybrid transformer structure equivalent to that of FIG. 36.

FIGS. 39 and 40 show hybrid transformer equivalent sections for those of FIGS. 35 and 36 respectively. Capacitor 44 appears when the section of FIG. 35 has a left-hand excess capacitor 38, while capacitor 44' shown in a dotted line connection will appear when the section of FIG. 35 has a right-hand excess capacitor 38'. In FIG. 40, the series capacitor 45 obviously has a value equal to half that of the capacitors 39 and 40 of FIG. 36 which are of equal value.

While the structures of FIGS. 33 and 34 have been obtained on an image parameter basis, these structures are however equally suitable for insertion loss design as for image parameter design, the number of effective attenuation poles as well as their location being the same in both cases. Furthermore, the various transformations described above do in no way assume any particular relationship to hold between the element values of these structures.

However, the method described in relation to FIGS. 32 to 40 for obtaining antimetrical crystal filters are no longer applicable if more than one section of the type shown in FIG. 8 or 9 should be used. It will now be shown however, that antimetrical crystal filters with an arbitrary number of attenuation poles can be obtained. Assuming an image parameter design, it will be shown that structures equivalent to the impedance transforming terminating half sections of FIGS. 11 and 12 can be derived in such a way that by using the terminating half section of FIG. 11 at one end of the composite structure and the terminating half section of FIG. 12 at the other end, this when the overall structure is to be of the antimetrical type, the latter structure or part thereof can still be transformed using equivalent lattice sections having all the structural properties required for realization by crystals and capacitors. This essentially means that the terminating half sections of FIGS. 11 and 12 should be so transformed that a central structure appears between a series coil at one end and a shunt coil at the other end, which is symmetrical as well as capacitive both at high and low frequencies.

Figure 41:
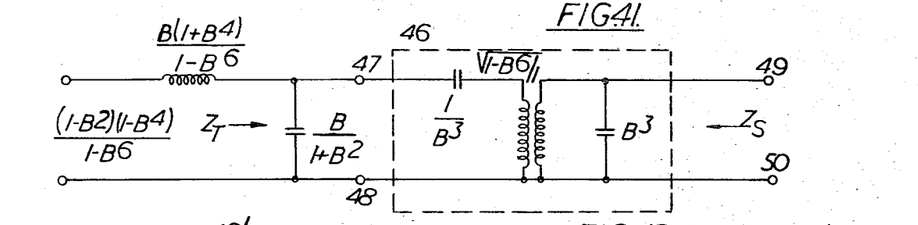
FIG. 41, a terminating half section equivalent to that of FIG. 11.
Figure 42:
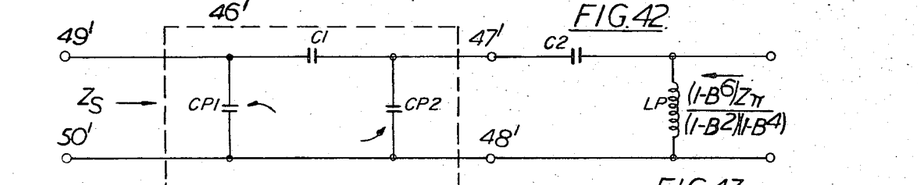
FIG. 42, a terminating half section equivalent to that of FIG. 12.

FIGS. 41 and 42 respectively show circuits which are equivalent to those of the terminating half sections of FIGS. 11 and 12 except for a factor in the $Z_T$ or $Z_\pi$ type image impedances respectively, as indicated by the factors multiplying the $Z_T$ and the $Z_\pi$ image impedances and appearing in FIGS. 41 and 42 together with the normalized element values, using the same B parameter already appearing in FIGS. 11 and 12. Thus, the terminating half section of FIG. 11 still starts with a series inductance but of normalized value $$\frac{B(1-B^4)}{1-B^6}$$

on the $Z_T$ side and this is followed by a shunt capacitor of normalized value $$\frac{B}{1+B^2}$$

which is at the input of a capacitive quadruple 46, the output of which constitutes the $Z_S$ end of the terminating half section. Likewise, the terminating half section of FIG. 12 becomes in FIG. 42 a network which still starts with a shunt coil on the $Z_\pi$ side, this being followed by a series capacitor of normalized value $$\frac{1+B^2}{B}$$

which is then followed by a capacitive quadruple 46' having characteristics absolutely identical to the quadrupole 46 in FIG. 41, this to reach the $Z_S$ end of the terminating half section.

The two quadripoles 46 and 46' shown respectively in FIG. 41 and FIG. 42 have absolutely identical characteristics when seen from the pairs of terminals 47–48, 49–50 and 47'–48', 49'–50' respectively, although the two quadripoles have been represented in two different ways rigorously equivalent with one another. In FIG. 41, terminal 47 leads to an ideal transformer of step down impedance ratio of $1-B^6$ (the voltage ratio is indicated on the figure) through a series capacitor of normalized value equal to $$\frac{1}{B^3}$$

while the secondary of the ideal transformer is shunted by a capacitor of normalized value $B^3$ in shunt across the pair of terminals 49–50. But the equivalent three parameter representation in FIG. 42 using a $\pi$-network of capacitors having the indicated normalized values clearly shows that the quadripole 46 or 46' is in fact symmetrical so that the representation of 46 could be reversed with the quadripole facing the other way round.

The fact that the quadripole 46 or 46' is symmetrical is actually incidental since what is required is that the same quadripole should be included as part of the transformed half section of FIG. 41, as well as part of the transformed half section of FIG. 42. The components have the following values:

$$C_1 = \frac{\sqrt{1-B^6}}{B^3}$$

$$C_{p1} = C_{p2} = \frac{1-\sqrt{1-B^6}}{B^3}$$

$$C_2 = \frac{1+B^2}{B}$$

$$L_p = \frac{1-B^6}{B(1-B^4)}$$

Figure 43:
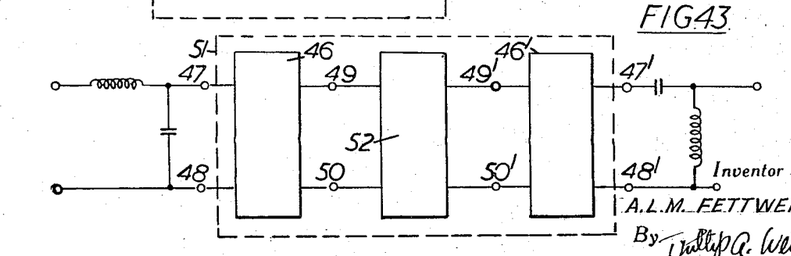
FIG. 43, a composite filter structure using the terminating half section of FIG. 41 at one end and that of FIG. 42 at the other end.

FIG. 43 shows that by using the transformed half sections of FIGS. 41 and 42, it is possible to realize any antimetrical filter composed of filter sections of the type shown in FIGS. 8 and 9 and terminated by impedances transforming half sections, one of the type of FIG. 11 at one end of the filter structure and the other of the FIG. 12 type at the other end of the structure. Using the equivalents of FIGS. 41 and 42, any such filter structure will thus take the appearance shown in FIG. 43 where the central part 51 of the structure and surrounded by the dotted line rectangle is symmetrical since it includes identical quadripoles 46 and 46' of FIGS. 41 and 42 respectively which surround the central part 52 of the structure which is a symmetrical quadripole composed of any number of cascaded sections of the FIG. 8 or 9 type.

Since the quadripole 51 is symmetrical and since its input impedances on each side are capacitive both at high and at low frequency, it may be replaced by an equivalent lattice section having all the structural properties required for realization by crystals and capacitors only.

In FIG. 43, it should be noted that after transformation of 52 into an equivalent lattice section, by Mason's theorem it will be possible to integrate the two shunt capacitors of equal normalized value $B^3$ in 46 and 46', in the versions used in FIG. 41, and appearing at both ends of 52, so that these capacitors will help towards the increase of the $C_{oi}/C_i$ factor thereby permitting to produce an increased bandwidth. Likewise, after the elimination of the ideal transformers included in 46 and 46', the series capacitances of equal normalized value appearing to the left and to the right of 52 can also be integrated into the central lattice section by virtue of Mason's theorem and though this time this is the integration of external series capacitances, with regard to the ratio $C_{oi}/C_i$ defining the possible bandwidth, the effect will be the same, i.e. it will add to the increase of this ratio and thereby permit improved bandwidths.

Thus, the use of the complementary terminating half sections of the type shown by FIGS. 11 and 12, will permit to realize novel and useful antimetrical filter structures.

In general, antimetrical filter structures will be of particular interest for the realization of crystal channel filters used in carrier transmission systems, such as those with an interval of 4 kc./s. between adjacent channels. Indeed, in such a case, it is desirable that the channel filters should present a high impedance outside the passband at one terminal pair in order to make them suitable for parallel interconnection. On the other hand, at the other terminal pair it is advantageous to be able to terminate them by a shunt coil since then the additional modulator transformer which would otherwise be required, can be spared if this is desirable. The principles of the structures disclosed above permit to achieve this and the actual structure of such a channel filter as well as its design principles will now be described in connection with FIG. 44.

Figure 44:
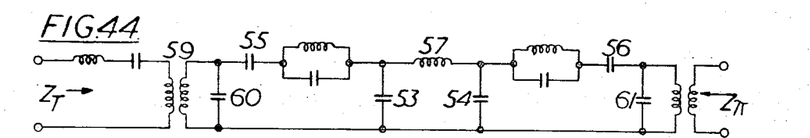
FIG. 44, a composite passband ladder filter structure suitable for the design of crystal channel filters used in carrier telephony.

FIG. 44 shows a filter structure which by comparison with FIGS. 11 and 33 will be recognized as comprising two antimetrical sections of the type shown in FIG. 33 connected in cascade at their $Z_T$ image impedance end, and with one of the sections being further cascaded at its $Z_\pi$ image impedance end with a terminating half section of the type shown, i.e. the simple constant-K type which will transform the mid-shunt $Z_\pi$ image impedance into the mid-series $Z_T$ image impedance, thus producing an overall antimetrical structure. This structure of FIG. 44 will permit to obtain a double insertion loss pole at zero frequency, a double insertion loss pole at infinite frequency and one insertion loss pole at each of two appropriately chosen frequencies located in the upper stopband near the cut-off frequency.

These insertion loss characteristics have been deduced after making a thorough analysis of the practical requirements which must be satisfied by the channel filters apart from the antimetrical properties already explained.

These requirements to be satisfied are that the two attenuation poles mentioned and closest to the passband should be obtained by means of quartz crystals in order to ensure a good stability and a small distortion near the edges of the passband, while the passband distortion should be small enough not to require dissipation compensation or special attenuation equalizers. Since economy and small size are of paramount importance, the structure should employ the minimum number of coils and crystals which will mean that crystal lattice sections should be used or more precisely the bridge type or hybrid transformer equivalent of the lattice should be used without that this equivalent should introduce an additional coil. Further, since the lattice structure or its bridge type equivalent has less stability than the ladder type, only one crystal per lattice section should be used. Moreover, for optimum design the structure employed should be suitable for calculation by the insertion loss method. Yet another requirement is that the structure should be such that the impedance levels of the lattices connecting the crystals can easily be changed so that the crystal inductances can, to a certain extent, be chosen arbitrarily. This is of particular importance for channel filters since it is then possible to secure the crystals for the various channel filters from the same slab or at least from two slabs, one for each of the two sections, and in particular to use the same thickness for all the crystals or for all of each series, which is of particular advantage since this is the most critical dimension for crystals operating in the longitudinal oscillation mode.

In addition to these requirements, the stopband attenuation should of course be sufficient to cover the latest requirements of the CCITT for modern carrier systems.

Finally, the structure should be such that parasitic elements can easily be taken into account, i.e. parasitic capacitances should fall across existing capacitances and leakage inductances should appear in series with existing inductances.

The structure of FIG. 44 can be transformed into a structure realizable with crystals in the manner previously explained, but in connection with the design of this filter on an insertion loss basis, the structure shown is not yet suitable for such a computation since there is an excess capacitor.

Norton transformations may however be applied to the shunt capacitors 53 and 54 to transform each of these into a T-network of capacitors (not shown) with one of the series capacitors in each of the equivalent T-networks of negative value, each of these T-networks being cascaded with an ideal transformer (not shown). The transformer ratios of these ideal transformers may be selected so that the two series negative capacitors introduced by the two Norton transformations will eventually, after elimination of the two ideal transformers by suitable changes in the values of the elements, be in series with the series capacitors 55 and 56 respectively, having positive values, after the modifications due to the elimination of the ideal transformers, exactly equal to the values of the negative capacitors. Hence, a new structure is obtained without the two series capacitors 55 and 56 of FIG. 44.

Figure 45:
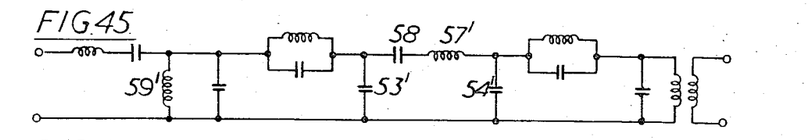
FIG. 45, a structure equivalent to that of FIG. 44 but in which an excess element has been removed to permit calculation on an insertion loss basis.

FIG. 45 shows the transformed structure in which of course, the central series inductance 57 of FIG. 44 and which is still present as 57', with a modified value, in FIG. 45, is now in series with a capacitor 58 due to the double Norton transformations of the shunt capacitors 53 and 54. But since two elements, i.e. capacitors 56 and 55 have been eliminated, the structure of FIG. 45, where the transformer 59 of FIG. 44 has been replaced by a shunt inductance cascaded with an ideal transformer to be eliminated by impedance transformations so that only the shunt inductance 59' remains in FIG. 45, no longer contains an excess element and accordingly all the element values of the structure of FIG. 45 may be computed by the insertion loss method. Once the design values of all the elements of FIG. 45 have been chosen, Norton transformations applied respectively to the shunt capacitors 53' and 54' will obviously permit to revert to the original structure of FIG. 44 which has an additional degree of freedom and which is suitable for realization by crystals after suitable transformations.

Figures 46, 47, 48:
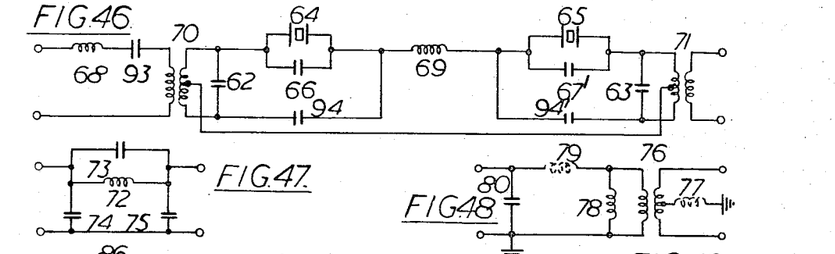
FIG. 46, a structure equivalent to that of FIG. 44 using two hybrid transformer crystal sections.
FIG. 48, the equivalent circuit of a hybrid transformer including both parasitic capacitance and leakage inductance effects.

FIG. 46 shows the structure equivalent to that of FIG. 44 but which is now suitable for realization by using two crystals. The structure of FIG. 46 is obtained as will be clear by referring to FIGS. 35 and 41, the latter with the shunt capacitor 44' shown in dotted lines and not the shunt capacitor 44, by assuming that the capacitance values of 60 and 61 in FIG. 44 are larger than those of 53 and 54 respectively. In FIG. 46, the shunt capacitor 62 has thus a value corresponding to the difference in capacitance between 60 and 53 in FIG. 44 and the same is true for the shunt capacitor 63 which is equal to the difference in values between 61 and 54 appearing in FIG. 44. In FIG. 46, the actual crystals 64 and 65 have been represented together with the capacitances 66 and 67 respectively associated in shunt thereon, instead of the equivalent reactive dipoles with two capacitors and one inductance. The structure of FIG. 46 fulfills all the requirements outlined above, but it has still to be proved that it is a suitable structure for taking parasitic elements into account. Apart from the parasitic capacitances to ground, the parasitic capacitances of the series coils 68 and 69 (FIG. 46) must be considered as well as those of the hybrid transformers 70 and 71 (FIG. 46) plus also their leakage inductances. It is known from an article by A. Fettweis, published in the Revue HF., vol. V, No. 2, 1961, page 1, that the distributed parasitic capacitances of a series coil may be represented by an equivalent circuit which is shown in FIG. 47.

FIG. 47 shows the series coil 72 which is shunted by an equivalent parasitic capacitance 73 and which has its two terminals connected to ground via the equivalent parasitic shunt capacitances 74 and 75 respectively. In this equivalent circuit with a π-configuration, the equivalent series parasitic capacitance 73 may have either a positive or a negative value.

FIG. 48 on the other hand, shows the equivalent circuit of the hybrid transformer such as 70 shown in FIG. 46, both the inductive and capacitive parasitic elements being included. Assuming an unbalanced structure of the type shown in FIG. 46 with the midpoint tapping on one of the windings of the hybrid transformers 70 and 71 grounded, while one end of the outer windings of these transformers is also grounded, as represented in FIG. 48, such hybrid transformers can be considered as equivalent to an ideal hybrid transformer 76, with the midpoint tapping grounded through the leakage inductance 77, with the other winding of the ideal hybrid transformer shunted by the equivalent shunt inductance 78 of the transformer and with the ungrounded end of this last winding connected to the ungrounded input terminal through the series leakage inductance 79, this last input terminal being connected to ground through the parasitic capacitance 80. This last equivalent circuit assumes that second order interacting effects between the inductive and capacitive parasitic elements can be neglected.

Figures 49, 50, 51:
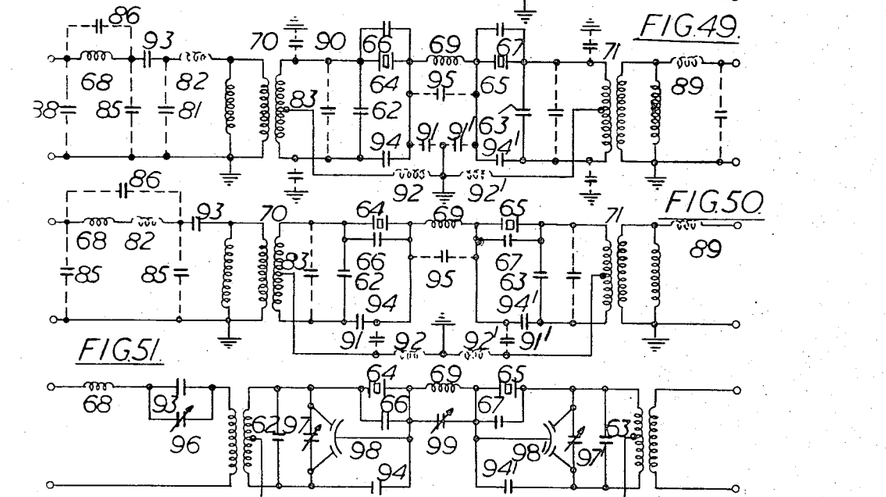
FIG. 49, the structure of FIG. 46 showing the parasitic elements.
FIG. 50, the structure of FIG. 49 after some transformations of the parasitic elements.
FIG. 51, the structure of FIG. 46 showing the capacitive trimmers.

FIG. 49 shows the circuit equivalent to that of FIG. 46, when taking into account all the stray capacitances to ground as well as the other parasitic elements and this by way of the equivalent circuits of FIGS. 47 and 48.

In FIG. 49, all the parasitic capacitances are shown in dotted lines. The circuit of FIG. 49 may be simplified by the previous assumption used for FIG. 48, i.e. that second order interacting effects may be neglected. Then, the order of the two consecutive parasitic elements such as the shunt capacitance 81 and the series inductance 82 may be interchanged and it is then obvious that the parasitic capacitance 81 can be considered as merely adding to the effect of the parasitic capacitance 83 directly in shunt across the physical capacitance 62. For stability reasons of course, all parasitic elements must be kept small with respect to the main elements so that second order interaction effects between different parasitic elements are usually truly negligible. In this manner, the circuit of FIG. 49 may become that shown in FIG. 50. In this figure, it will be recognized that due to the transfer of the parasitic capacitance 81 across the physical capacitance 62, the leakage inductance 82 on the right of the parasitic capacitance 85 may be transferred to the left of this capacitance and then the right-hand end of the parasitic capacitance 86 may be transferred to the right-hand end of the leakage inductance 82, so that the latter is now directly in series with the physical inductance 87 as required. The effect of the shunt parasitic capacitance 88 can be shown to be completely negligible since it appears in parallel with a terminating resistance. This is also true for the series leakage inductance 89 which is directly in series with the other terminating resistance at the right-hand end of the filter structure.

The stray capacitances to earth such as 90 shown in FIG. 49 have disappeared from FIG. 50, since stray capacitances appear directly across the half-windings of the hybrid transformer such as 70, so that they can be integrated with the stray capacitance 83 directly across the physical capacitor 62. The stray capacitance to ground such as 91 in FIG. 49 and which takes into account the equivalent circuit of the series coil 69 in the manner explained, in relation to FIG. 47, has been displaced in FIG. 50 and its previously grounded end is now connected to the midpoint tapping of the hybrid transformer 70 since its location with respect to the leakage inductance 92 connected between this midpoint tapping and ground can be interchanged, as second order interacting effects between inductance and capacitive parasitic elements can be neglected.

Considering FIG. 47 showing the equivalent circuit of a series coil taking into account parasitic capacitance effects, it has been shown in the corresponding reference that the series capacitance 73 directly across the coil 72 can either be positive or negative, so that the coil can be designed in such a way that this capacitance is zero or almost zero. Thus, considering again FIG. 50 showing the simplified circuit of the complete filter structure taking into account the parasitic elements, the parasitic capacitance 86 can be eliminated. The series leakage inductance is readily accounted for as it is in series with the physical inductance 68. The stray capacitance to ground 85 can be eliminated by transforming the physical series capacitor 93 by means of the Norton transformation. This will produce for 93 an equivalent π-network of capacitors in cascade with an ideal transformer and the Norton transformation ratio can be chosen so that the left-hand shunt capacitor appearing directly across the stray capacitance 85 will be of equal value but opposite in signal so that this stray capacitance can be eliminated. The right-hand capacitor (not shown) can of course be integrated with 62 while the ideal transformer will be eliminated by suitable impedance level changes.

The stray capacitances 91 and 91' appear across one pair of terminals of the Jaumann or bridge type equivalent circuit of a lattice and in particular that comprising the hybrid transformer 70 and the series arms including the crystal 64 shunted by the capacitor 66 and the capacitor 94 respectively. As one may decompose the capacitance formed by 83 and 62 in parallel so that they constitute the sum of a capacitance equal to that of 91 plus a residue, by Mason's theorem it is then possible, in the manner previously referred to, to account the stray capacitance as an added stray capacitance in shunt across the physical elements 66 and 94. Evidently, the stray capacitance 91' may be accounted for in a similar way as 91 with the interesting result that the leakage inductances 92 and 92' are now virtually in series with the physical inductance 69 in the mesh interconnecting the two crystal sections so that these leakage inductances can also be taken into account without any difficulty. This will be particularly true, since by adding a positive capacitance across the series coil 69, it will be possible to render the overall capacitance across this coil negligibly small, since the parasitic capacitance 95 across this coil can be chosen to be negative by suitable design of the coil.

FIG. 51 shows the final practical filter structure corresponding to those of FIGS. 46, 49 and 50 including six capacitor trimmers: 96 across 93, 97 and 97' respectively across 62 and 63, the differential trimmers 98 and 98' across 66–94 and 66–94' respectively and finally 99 across the inductance 69 and permitting to cancel the negative parasitic capacitance across this coil. Thus the circuit incorporates six trimmers of which two differential trimmers serving to adjust the correct location of the attenuation poles. Including the adjustments of the two crystal resonant frequencies, there are thus a total of eight frequency adjustments foreseen. This is sufficient as the transfer function is of the form $$\frac{g}{p^4(p^2+w_1^2)(p^2+w_2^2)}$$

where $g$ is a polynomial of the twelfth degree in $p$ requiring six frequency adjustments while the denominator of the above transfer function indicates that two more adjustments are required, $w_1$ and $w_2$ being the infinite attenuation angular frequencies of the filter.

Instead of the Jaumann equivalent structure shown in FIG. 46, another equivalent of the lattice may be used. It is possible to transform a lattice structure using two pairs of impedances of like values into a bridge type structure, without necessitating the use of a transformer with a midpoint tapping as used for the equivalents of FIG. 46. In fact, this bridge type transmission network without a hybrid transformer can be used not only as an equivalent for a lattice structure and hence as an equivalent for a symmetrical π- or T-network, but it may even replace an unsymmetrical π- or T-network provided it is cascaded with an ideal transformer. In particular, if the lattice comprises a pair of purely capacitive branches and a pair of equal complex reactive branches which are capacitive both at low and at high frequency, or alternatively if the equivalent π- or T-network comprises two purely capacitive shunt or series branches respectively associated with a complex reactive branch which is capacitive both at low and at high frequency, the bridge type equivalent will be like the Jaumann equivalent except that the differential transformer will be replaced by an ideal transformer shunted by two serially connected capacitances of which the interconnecting point takes the place of the midpoint tapping of the differential transformer which is now eliminated.

Figure 52:
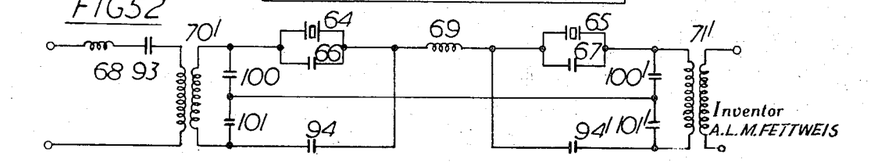
FIG. 52, an alternative structure to that of FIG. 46 in which bridge type sections avoiding hybrid transformers are used.

FIG. 52 represents the structure equivalent to that of FIG. 46 and which can now be obtained by way of this equivalence. The previous differential transformers 70 and 71 of FIG. 46 have now become ordinary transformers 70' and 71' and there are now two series capacitors 100 and 101 serially connected across the inside winding of transformer 70, on the side of the crystals such as 64. Two capacitors 100' and 101' are serially connected across transformer 71 in a like manner and the junction points of these two pairs of capacitors are interconnected just as in FIG. 46 the midpoint tappings of the two hybrid transformers 70 and 71 were interconnected.

It will be clear that the structure of FIG. 52 is just as suitable as the structure of FIG. 46 in what concerns the parasitic elements. These can be accounted for substantially in the same manner as shown in FIGS. 49 and 50. The parasitic capacitances on each side of the bridge type section such as that comprising the crystal 64 and the capacitors 94, 100 and 101 can readily be taken into account when considering the π-section equivalent to this bridge type section. The leakage inductance 92 and 92' of FIG. 50 need of course no longer be considered in FIG. 52, since they were the result of the hybrid transformers which are avoided in the last figure.

While the principles of the invention have been described above in connection with specific apparatus; it is to be clearly understood that this description is made only by way of example and not as a limitation on the scope of the invention.

I claim:

A bandpass filter operating between resistive termination and using electromechanical resonators such as piezoelectric crystals, said filter comprising at least one ladder type antimetrical composite filter structure, said composite filter structure comprising a π-section with a first terminating half section on one side and a second terminating half section on the other side, said π-section having crystal structure on the series branch and capacitances on the two shunt branches, said π-section having one resonant and one antiresonant frequency and being capacitive both at zero frequency and at infinite frequency, said first terminating half section comprising a first series inductance, coupled to a first series capacitance followed by a first shunt capacitance, said second terminating half section comprising a second series capacitance followed by a second shunt capacitance in parallel with a first shunt inductance, said half sections having characteristics such that the impedance characteristics of the π-section are matched at all frequencies, the image impedance on the side of said first shunt inductance having a frequency characteristic inverse of that on the side of said first series inductance which impedance is proportional to:

$$1/P\sqrt{(P^2+B^2)(1+P^2B^2)}$$

wherein $B^2$ is the ratio between the lower and the higher cut-off frequencies and $P$ is an imaginary frequency parameter normalized with respect to the midband frequency equal to the geometric means of said cut-off frequencies.

References Cited
UNITED STATES PATENTS

| | | | |
|---|---|---|---|
| 1,996,504 | 12/1935 | Darlington | 333—72 |
| 2,222,417 | 11/1940 | Mason | 333—72 |
| 2,406,796 | 9/1946 | Bies | 333—72 |
| 2,429,639 | 10/1947 | McSkimin | 333—72 |
| 2,452,114 | 10/1948 | Farkas | 333—72 |
| 2,546,994 | 4/1951 | Feomageot | 179—15 |
| 2,866,951 | 12/1958 | Oswald | 333—74 |

(Other references on following page)

OTHER REFERENCES

D'Heedene: IRE Wescon Convention Record, part 6, 1957, pp. 83–93.

Kosowsky: Proc. I.R.E., February 1958, pp. 421–425.

Mason: BSTJ, vol. 13, pp. 405–52, July 1934.

Cauer: "Synthesis of Linear Networks," vol. 1, pp. 339–340, pub. 1958, McGraw-Hill Book Co., New York, N.Y.

HERMAN KARL SAALBACH, *Primary Examiner.*

C. BARAFF, *Assistant Examiner.*